(12) United States Patent
Pelot et al.

(10) Patent No.: US 6,699,321 B2
(45) Date of Patent: *Mar. 2, 2004

(54) CONCRETE COMPOSITION

(75) Inventors: James E. Pelot, Lewisville, NC (US); Stephen Z. Baxter, Dallas, NC (US)

(73) Assignee: Glasflo Products, Inc., Lewisville, NC (US)

( * ) Notice: Subject to any disclaimer, the term of this patent is extended or adjusted under 35 U.S.C. 154(b) by 10 days.

This patent is subject to a terminal disclaimer.

(21) Appl. No.: 09/999,659

(22) Filed: Oct. 24, 2001

(65) Prior Publication Data

US 2002/0053304 A1 May 9, 2002

Related U.S. Application Data

(63) Continuation-in-part of application No. 09/557,504, filed on Apr. 25, 2000, now Pat. No. 6,344,081.
(60) Provisional application No. 60/263,130, filed on Jan. 19, 2001, provisional application No. 60/164,524, filed on Nov. 10, 1999, provisional application No. 60/164,629, filed on Nov. 10, 1999, provisional application No. 60/178,457, filed on Jan. 27, 2000, and provisional application No. 60/190,454, filed on Mar. 17, 2000.

(51) Int. Cl.$^7$ .......................... C04B 14/02; C04B 14/22
(52) U.S. Cl. ...................... 106/711; 106/705; 106/709; 106/714; 106/716; 106/789; 106/814; 106/816; 106/697
(58) Field of Search ................................ 106/705, 709, 106/711, 714, 716, 789, 814, 816, 697

(56) References Cited

U.S. PATENT DOCUMENTS

| | | | |
|---|---|---|---|
| 2,410,954 A | 11/1946 | Sharp | 106/98 |
| 2,524,947 A | 10/1950 | Wallace | 106/97 |
| 2,793,130 A | 5/1957 | Shannon et al. | 106/99 |
| 3,823,021 A | 7/1974 | Jansen | 106/97 |
| 3,954,490 A | 5/1976 | Cockram | |
| 4,002,482 A | 1/1977 | Coenen | 106/40 V |
| 4,090,884 A | 5/1978 | Goeman | 106/99 |
| 4,440,576 A | 4/1984 | Flannery et al. | 106/85 |
| 4,454,285 A | 6/1984 | Bijen | 524/5 |
| 4,534,796 A | 8/1985 | Massol | 106/99 |
| RE32,742 E | 9/1988 | Skjeldal | 106/98 |
| 5,690,729 A | 11/1997 | Jones, Jr. | 106/682 |
| 5,755,876 A | 5/1998 | Stokes et al. | 106/739 |
| 5,788,407 A | 8/1998 | Hwang | 404/81 |
| 5,803,960 A | 9/1998 | Baxter | 106/711 |
| 5,810,921 A | 9/1998 | Baxter et al. | 106/711 |
| 5,916,361 A | 6/1999 | Molloy et al. | 106/696 |
| 6,022,408 A | 2/2000 | Stokes et al. | 106/739 |
| 6,324,802 B1 | 12/2001 | Garrett | 52/309.12 |
| 6,344,081 B1 * | 2/2002 | Pelot et al. | 106/711 |

OTHER PUBLICATIONS

Meyer, C.M. and S. Baxter, "Use of Recycled Glass for Concrete Masonry Blocks," Final Report prepared for The New York State Energy Research and Development Authority (NYSERDA), Report 97–15; Technical Communication Unit, NYSERDA, Corp. Plaza West, 286 Washington Ave. Extension, Albany, NY 12203–6399, http://www.nyserda.org (Nov. 1997).

Meyer, C.M. and S. Baxter, "Use of Recycled Glass and Fly Ash for Precast Concrete," Final Report prepared for The New York State Energy Research and Development Authority (NYSERDA), Report 98–18; Technical Communication Unit, NYSERDA, Corp. Plaza West, 286 Washington Ave. Extension, Albany, NY 12203–6399, http://www.nyserda.org (Oct. 1998).

"Reuse/Recycling of Glass Cullet for Non–container Uses," pp. 42–51, "Concrete Applications." Prepared for Dane County Department of Public Works, 1919 Exp Way, Madison, WI 53713; Ed. John Reindl (Obtainable from Ed. at reindl@co. dane.wi.us; Ph. No. (608)267–8815 (Feb. 20, 2000).

"Glass Aggregate in Concrete Demonstration Project: Final Report," Prepared for Dane County Department of Public Works by Prof. Steven M. Cramer and R.A. Wells, Department of Civil and Environmental Engineering, Univ. of Wisconsin–Madison.

\* cited by examiner

*Primary Examiner*—Elizabeth Wood
(74) *Attorney, Agent, or Firm*—Womble Carlyle Sandridge & Rice PLLC

(57) ABSTRACT

A concrete composition contain glass, including ordinary recycled glass is provided. The invention also relates to methods of producing the concrete compositions of the invention. A concrete composition containing glass particles, including recycled glass, a substance to mitigate alkali-silica reaction such as E-glass particles, and or pozzolans and/or lithium-containing substances, and cement is provided as well. Compositions containing E-glass (also known as electric glass) and processes for producing E-glass-containing compositions are also provided.

34 Claims, 7 Drawing Sheets

CONCRETE COMPOSITION

This application claims benefit under 35 U.S.C. §119(e) of U.S. Provisional Application No. 60/263,130, filed Jan. 19, 2001; and is a continuation-in-part under 35 U.S.C. §120 of U.S. Application Ser. No. 09/557,504, filed Apr. 25, 2000, now U.S. Pat. No. 6,344,081; which claims benefit under 35 U.S.C. § 119(e) of U.S. Provisional Applications No. 60/164,524, filed Nov. 10, 1999; application Ser. No. 60/164,629, filed Nov. 10, 1999; application Ser. No. 60/178,457, filed Jan. 27, 2000; and application Ser. No. 60/190,454, filed Mar. 17, 2000, the contents of all of which are fully incorporated by reference herein.

FIELD OF THE INVENTION

The present invention relates to the production of concrete compositions having improved characteristics and containing glass, including ordinary recycled glass. In particular, the invention relates to concrete compositions having glass aggregate, including coarse and fine glass aggregate. The present invention also relates to compositions containing E-glass (also known as electric glass). Processes for producing the compositions of the invention are also provided.

BACKGROUND

Due to recent interest in recycling and improved collection for recycling of glass, a significant surplus of recycled glass has accumulated. A substantial amount of such glass is simply land-filled, there being no significant economic motive for its further use. Significant amounts of glass byproducts are also generated from certain manufacturing processes which are not readily disposed of, or productively utilized.

A number of attempts have been made to successfully use glass as an additive in concrete compositions. Certain compositions proposed have been successful in accomplishing specific goals. For example, U.S. Pat. Nos. 5,803,960 and 5,810,921 to Baxter, describe the addition of lithium-containing and chromium-containing glass, respectively, in order to overcome alkali-silica reaction (ASR) in concrete compositions. The glass compositions disclosed, however, are specifically directed to the suppression of ASR, and must be specially formulated. Glass compositions containing zirconia have also been suggested as alkali-resistant glass components of cement compositions (glass fibers—U.S. Pat. No. 5,912,361, to Molloy et al.). Other forms of specially treated glass fibers for concrete reinforcement have also been suggested, as have certain specialized compositions containing very fine silica particles or silica dust, e.g. as disclosed in U.S. Pat. No. 4,385,935, to Skjeldal (reissue Re. 32,742).

Desired characteristics of a general use concrete composition include adequate strength, a reasonable open time (time from pouring to irreversible set), decreased slump, decreased splash, decreased creep, a thixotropic character during open time allowing re-working of the initial set using vibration of the mixture, decreased bleed, and increased density and water impermeability.

Certain applications may require concrete compositions possessing further special characteristics. One example is the application of concrete compositions to form the areas adjacent to, or inside of, swimming pools or other outdoor recreational areas. It is desirable to produce a composition which may be effectively "washed" after pouring, such that an increased amount of surface area is actually comprised of exposed aggregate component surfaces. This reduces the temperature experienced when such surfaces are contacted, e.g. by bare feet of persons utilizing the area around a swimming pool. Accordingly, it would be desirable to formulate a cement or concrete composition which exhibits superior characteristics particularly applicable to such uses. Such characteristics include superior workability, as discussed above, and characteristics compatible with the particular processes for preparing surfaces of such outdoor recreational areas.

Accordingly, it would be very desirable to produce a concrete composition possessing these desired characteristics by utilizing a glass component capable of having the ordinary composition of recycled glass, or utilizing a glass component derived from an industrial byproduct.

E-glass, also referred to as electric glass, is a type of borosilicate glass. E-glass is typically produced as a fiber component, e.g. for use in reinforced plastics utilized in applications requiring a high degree of electrical resistivity. The production method generally utilized results in a substantial amount of waste which is unusable in the standard application. Therefore, the use of E-glass in an improved concrete composition also would also provide a productive use for waste E-glass, as well as imparting superior characteristics to such compositions. Accordingly, it would also be desirable to produce a concrete composition having improved characteristics which includes in its composition a component comprising E-glass. In addition, it would also be desirable to provide a process wherein an E-glass component may be added to a general processing operation to producing a cement or concrete composition suitable for transport or immediate use.

SUMMARY OF THE INVENTION

The present invention provides cement and concrete compositions having improved characteristics which contain glass, including recycled glass as well as compositions containing E-glass. The invention also relates to methods for producing the concrete compositions of the invention. The concrete compositions of the invention are particularly useful because they exhibit adequate strength, a reasonable open time (time from pouring to irreversible set), decreased slump, decreased splash, decreased creep, a thixotropic character during open time allowing re-working of the initial set using vibration of the mixture, decreased bleed, and increased density and water impermeability.

The present invention also provides a use for, and means of disposal of, both recycled glass and waste E-glass. The recycled glass used in particular compositions of the invention is not of any specialized glass composition, nor is it specially treated. Further, the invention provides a process for producing E-glass containing cement or concrete compositions wherein the E-glass component is added prior to a general processing operation in the production of the cement or concrete compositions. Such a process increases the efficiency of the production of composition of the invention in a form suitable for transport, storage or immediate use.

In one aspect, the present invention relates to a concrete composition comprising glass particles, cement, and aggregate, wherein the size of the glass particles comprises a graded particle size distribution from about 100 mesh to about 325 mesh.

In another aspect, the invention relates to concrete composition comprising glass particles, cement, blast furnace slag and aggregate.

In another aspect, the invention relates to a concrete composition comprising glass particles, cement, fly ash, and aggregate.

In another aspect, this invention relates to a concrete composition comprising glass particles, cement, metakaolin, and aggregate. In another aspect, this invention relates to a concrete composition comprising glass particles, cement, silica fume, and aggregate.

In another aspect, the present invention relates to a cement and concrete compositions comprising glass particles, cement, a substance to mitigate alkali-silica reaction (ASR), and aggregate, wherein the size of the glass particles comprises a graded particle size distribution from about 100 mesh to about 325 mesh.

In another aspect, the present invention relates a composition comprising E-glass particles, cement, and aggregate, wherein the size of the E-glass particles comprises a maximum particle size of from about 270 to about 325 mesh.

In another aspect, the present invention relates a composition comprising E-glass particles, cement, and aggregate, wherein the size of the E-glass particles comprises a particle size of from about 4 to about 325 mesh.

In yet another aspect, the present invention relates to a concrete composition comprising a glass aggregate, cement, and E-glass particles.

In another aspect, the invention relates to methods of producing the cement and concrete compositions of the invention.

In order to produce a cement or concrete composition having desirable characteristics for forming surfaces for outdoor recreational areas, such as areas adjacent to, or inside of, swimming pools, the glass particles of the invention may be combined with cement, aggregate and a substance known in the art to reduce the phenomenon of alkali-silica reaction or ASR. Addition of such a substance is generally necessary in these applications due to the use of reactive aggregate in the final compositions. Significant advantageous properties are achieved by combining cement and aggregate with the glass particles as described and an effective amount of lithium-containing glass (see U.S. Pat. No. 5,803,960 to Baxter), or other substances known in the art to mitigate ASR. Also, substitution of a portion of the cement with E-glass particles allows utilization of glass as an aggregate by preventing the usual ASR expansion problems associated with use of glass aggregates in concrete.

The concrete compositions of the present invention flow only on demand, exhibit superior workability, and can be vibrated to activate the thixotropic character of the composition without segregation of the materials. The compositions of the invention are especially useful on steep slopes due to the reduced tendency to exhibit creep. The compositions also place less stress on forms and the forms may be stripped sooner. The compositions can also be pumped with lower slump than standard concrete and may be pumped under water with less segregation than standard compositions. The low slump compositions of the present invention also finish easier and smoother that standard concrete having similar slump characteristics. The compositions of the invention also exhibit less bleed water and the mix water remains in the composition, allowing it to be finished faster. Vibrating or manual manipulation causes the compositions to remain open for working longer (increased thixotropic character), however, once manipulation is stopped, the compositions becomes very stable allowing forms to be removed sooner.

The E-glass-containing compositions of the invention are particularly useful as pool plasters in the construction of swimming pools. These compositions have superior workability as described above. The E-glass also acts as a pozzolan and does not contribute to ASR. It increases flow, controls creep, and increases workability while controlling bleed water and shrinkage. The E-glass-containing compositions of the invention are also particularly useful as grouts or mortars.

The present invention, and preferred embodiments thereof, are described in more detail below. Although the present invention has been described with reference to certain embodiments, other embodiments may achieve similar results and advantages. Variations and modifications of the present invention will be apparent to one skilled in the art and the disclosure herein is intended to cover all such modifications and equivalents.

DETAILED DESCRIPTION OF THE INVENTION

Figure 1:
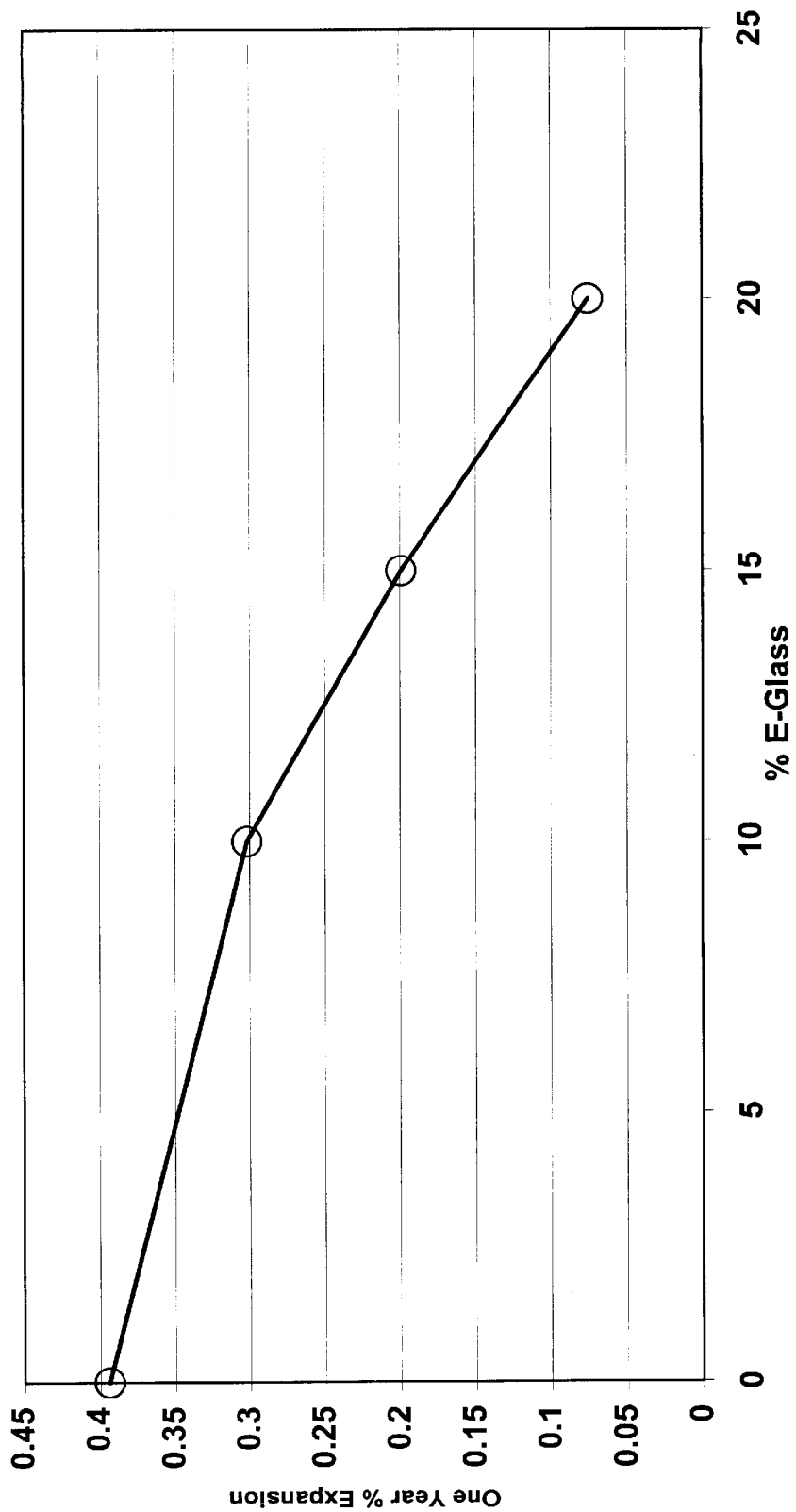
FIG. 1 is a graphic representation of the results of an ASTM C227 test performed using New Mexico aggregate with varying percentages of E-glass substituted for cement. Percent substitution of E-glass for cement is indicated on the X-axis, and percent expansion after one year is indicated on the Y-axis. Cement alkali, as indicated in sodium equivalents ($Na_2Oe$), was 0.99% (for definition of sodium equivalent, see Example 7).

As used herein, the term "particle" refers to a physical aspect of a concrete component, typical characterized by a diameter measurement or, in the case of the glass particles of the invention, by mesh size. Mesh size is a well-known measurement of particles in concrete and related technical areas such as mining. It is determined by establishing whether a certain particle will or will not pass through a certain characterized sieve or mesh. Particles, as referred to herein, are distinguished from fibers, which have one dimension that is significantly greater than all others. Fibers are ordinarily characterized by length, or by length and diameter.

Also, the term "aggregate," as used herein, refers to the traditional definition of concrete components which are either sand, gravel, crushed stone, or a substitute for such materials with respect to particle size. For example, glass particles may be substituted for aggregate. Such glass particles are sized in accordance with the recognized sizing of concrete aggregate materials such as sand and stone. Typically, "fine" aggregate is considered to be in the size range of sand, while "coarse" aggregate is considered to be in the size range of gravel or crushed stone. In addition, certain concrete compositions such as self-consolidating concrete, use aggregates finer than 100 mesh. This extends the recognized definition of fine aggregate to any non-cementitious materal coarser than cement.

In one aspect, the present invention relates to a concrete composition comprising glass particles, cement, and aggregate, wherein the size of the glass particles comprises a graded particle size distribution from about 30 mesh to about 325 mesh.

In a preferred embodiment, the size of the glass particles is characterized by a maximum size of from about 30 to about 100 mesh, and from about 40% to about 60% of the glass particles are from about 80 to about 200 mesh, and from about 10% to about 30% of said glass particles are less than 325 mesh. More preferably, the maximum size of the glass particles is about 80 to about 100 mesh. Also more preferably, substantially none of said glass particles are larger than 100 mesh. Also more preferably, about 70% to about 90% of the glass particles are larger than about 325 mesh. Most preferably, about 0% to about 30% of the glass particles is about 100 mesh, about 50% to about 80% of the glass particles is about 200 mesh, about 10% to about 20% of the glass particles is about 325 mesh, and about 0% to about 20% of the glass particles is below about 325 mesh.

In another preferred embodiment, the amount of cement normally added to a concrete composition containing no added glass is reduced from about 5% to about 15%. More preferably, the amount of cement normally added is reduced about 10%. Most preferably, the volume of the composition is adjusted for the addition of glass particles by the removal or exclusion of a proportionate volume of fine aggregate, such that over-yield of the mix is avoided.

In a preferred embodiment, the glass particles are present from about 15% to about 25%, by weight, of a conventional amount of cement used in concrete that contains no added glass particles. Most preferably, the glass particles are present at about 20%, by weight, of a conventional amount of cement used in a concrete compositions which contains no added glass particles.

Glass particles may also be added without a proportional reduction in the amount cement to achieve improved characteristics in the final cement or concrete composition. In a preferred embodiment, the glass particles are added in an amount from about 5% to about 20%, by weight, of a conventional amount of cement used in concrete which contains no added glass particles, wherein the conventional amount of cement is maintained. Most preferably, the glass particles are added in an amount of about 15%, by weight, of a conventional amount of cement used in concrete which contains no added glass particles.

The amount of glass particles present in the composition may be determined according to a desired strength of a finished concrete product produced from the composition.

In a preferred embodiment, the glass particles are present at about 50 lbs to about 70 lbs for each cubic yard of the concrete composition. Most preferably, the composition yields a finished concrete product having a compression strength of about 2500 psi.

In another preferred embodiment, the glass particles are present at about 80 lbs to about 100 lbs for each cubic yard of the concrete composition. Most preferably, the composition yields a finished concrete product having a compression strength of about 3000 psi.

In another preferred embodiment, the glass particles are present at about 100 lbs to about 120 lbs for each cubic yard of the concrete composition. Most preferably, the composition yields a finished concrete product having a compression strength of about 4000 psi.

In another preferred embodiment, the open time after pouring is increased. Most preferably, the composition is thixotropic during the open time.

In another preferred embodiment, mid-level alkali cement is used and the amount of glass particles in the composition is about 110% of the amount used with low alkali cement.

In another preferred embodiment, high alkali cement is used and the amount of glass particles in the composition is about 120% of the amount used with low alkali cement.

In another preferred embodiment, the concrete composition further comprises blast furnace slag. More preferably, the blast furnace slag comprises from about 30% to about 40%, by weight, and the glass particles from about 10% to about 20%, by weight, of a conventional amount of cement used in concrete which contains no added glass particles or blast furnace slag, the conventional amount of cement being reduced from about 40% to about 60% by weight. Even more preferably, the blast furnace slag comprises about 34%, by weight, and the glass particles about 16%, by weight, of a conventional amount of cement used in concrete which contains no added glass particles or blast furnace slag, the conventional amount of cement being reduced about 50% by weight. Most preferably, the blast furnace slag comprises about 40%, by weight, and the glass particles about 20%, by weight, of a conventional amount of cement used in concrete which contains no added glass particles or blast furnace slag, the conventional amount of cement being reduced from about 60% by weight.

In another preferred embodiment, the concrete composition further comprises fly ash. More preferably, the fly ash, glass particles, and cement together comprise a total weight equal to about 110%, by weight, of a conventional amount of cement used in concrete containing no added fly ash or glass particles, and the fly ash comprises from about 15% to about 25%, by weight, and the glass particles from about 15% to about 25%, by weight, of a conventional amount of cement used in a concrete composition containing no added fly ash or glass particles, the conventional amount of cement being reduced from about 20% to about 40%, by weight. Most preferably, the fly ash, glass particles, and cement together comprise a total weight equal to about 110%, by weight, of a conventional amount of cement used in concrete containing no added fly ash or glass particles, and the fly ash comprises about 20%, by weight, and the glass particles about 20%, by weight, of a conventional amount of cement used in a concrete composition containing no added fly ash or glass particles, the conventional amount of cement being reduced about 30% by weight.

The size distribution of the glass particles of certain embodiments of the invention fills the gap in the size range between that of sand and that of cement. The glass particles of the invention may be derived from clean glass, including recycled container glass, plate glass, and/or mirror glass. Without intending to be bound by any particular theory, it appears that the negative charge of the glass particles increases the adherence of the sand, cement, and glass mixture to the stone aggregate, such that the mixture does not tend to segregate. It appears that this aspect leads to a mix that has the ability to resist being washed away when subjected to excess water. The addition of glass particles according to the present invention also imparts a lubricating effect that allows the mix to be pumped and moved more easily, and/or to exhibit a thixotropic character.

In another aspect, the invention relates to a composition comprising glass particles, lithium-containing compounds, and cement. In a preferred embodiment, the lithium-containing compound is selected from the group consisting of lithium hydroxide, lithium carbonate, lithium nitrate, and lithium chloride. In another preferred embodiment, the lithium-containing compound is lithium-containing glass or lithia glass. More preferably, the cement composition comprises from about 10% to about 20% glass particles, by weight, from about 2% to about 6% lithium-containing glass, by weight, and from about 76% to about 84%, by weight, cement. Also more preferably, the cement composition comprises from about 14% to about 18% glass particles, by weight, from about 2% to about 6% lithium-containing glass, by weight, and from about 76% to about 84%, by weight, cement. Most preferably, the cement compositions comprises about 16% glass particles, by weight, about 4% lithium-containing glass, by weight, and about 80% cement, by weight. The foregoing compositions are combined in substantially equal parts, by weight, of suitable aggregate to form the final compositions to be combined with an appropriate amount of water to form the final concrete compositions.

In another preferred embodiment, the open time after pouring is increased. Most preferably, the composition is thixotropic during the open time.

Those of ordinary skill in the art will recognize that, in addition to the lithium-containing glass component, appropriate amounts of other substances known to mitigate ASR may be determined, and added in order to accomplish ASR suppression. Also, the amount of glass particles present in the composition may be determined according to a desired strength of a finished concrete product produced from the composition.

In yet another aspect, the invention relates to a composition comprising E-glass particles, cement, and aggregate, wherein the size of the E-glass particles comprises a maximum particle size of from about 275 to about 325 mesh. Most preferably, the maximum particle size is about 325 mesh.

In a preferred embodiment, the E-glass particles are substituted for a portion of the cement in an amount ranging from about 10% to about 30% by weight of the amount of cement in a standard composition not containing glass particles. More preferably, the E-glass particles are substituted for a portion of the cement in an amount ranging from about 15% to about 25% by weight of the amount of cement in a standard composition. Most preferably, E-glass particles are substituted for portion of the cement in an amount of about 20% by weight of the amount of cement in a standard composition.

E-glass particles may also be added without a proportional reduction in the amount cement to achieve improved characteristics in the final cement or concrete composition. Accordingly, in another preferred embodiment, the E-glass particles are added in an amount ranging from about 5% to about 30% by weight of the amount of cement in a standard composition not containing glass particles, wherein the conventional amount of cement is maintained. More preferably, the E-glass particles are added in an amount ranging from about 10% to about 25% by weight of the amount of cement in a standard composition. Most preferably, E-glass particles are added in an amount from about 15% to about 20% by weight of the amount of cement in a standard composition.

In another aspect, the invention relates to a process for preparing cement or concrete compositions wherein an E-glass component is added during a general processing operation in an unprocessed form along one or more other unprocessed cementitious components.

In a preferred embodiment, the E-glass component is added to an unprocessed cementitious component prior to a general processing operation. More preferably, the unprocessed E-glass component comprises E-glass cullet. Also more preferably, the E-glass cullet comprises a by-product of a process for producing fiber glass. Also more preferably, the unprocessed cementitious component is cement clinker. Also more preferably, the general processing operation comprises a final grinding process. Also more preferably, the unprocessed E-glass component is substituted for a portion of the cement clinker in an amount ranging from about 10% to about 30% by weight of the amount of cement in a standard composition not containing glass particles. Also more preferably, the E-glass component is substituted for a portion of the cement clinker in an amount ranging from about 15% to about 25% by weight of the amount of cement in a standard composition. Most preferably, E-glass component is substituted for portion of the cement clinker in an amount of about 20% by weight of the amount of cement in a standard composition. If an additional pozzolanic substance, such as metakaolin, fly ash, blast furnace slag or silica fume, is added, the amount of the E-glass component may be reduced while still providing the beneficial characteristics of the invention.

In another preferred embodiment, the concrete composition further comprises E-glass particles and silica fume, wherein the E-glass particles are from about 80 mesh to about 325 mesh. More preferably, the composition can also contain E-glass particles that are smaller than 325 mesh. Also, more preferably, the composition can contain up to about 10% silica fume.

In another preferred embodiment, the concrete composition comprises E-glass particles and a pozzolan, wherein the E-glass comprises particles of about 4 to about 325 mesh, minus 325 mesh and up to 20% pozzolanic material.

In yet another aspect, the invention relates to a composition comprising E-glass particles, cement, and aggregate, wherein the E-glass particles comprises a maximum particle size of from about 4 to about 100 mesh. More preferably, the maximum particle size is from about 80 to about 100 mesh. Most preferably, the maximum particle size is about 100 mesh. Because no size of E-glass particle causes ASR, E-glass can be used with reactive as well as non-reactive aggregate and can be included in any size.

The inclusion of the unprocessed E-glass component along with the unprocessed cementitious component leads to greater efficiency in producing the E-glass-containing compositions of the invention. During processing of the mixed components, the E-glass component acts as a grinding aid, and increases the though-put capacity of the process, particularly when using a ball-mill grinding process although other processes may also be used with similar increased efficiency.

The compositions of the invention containing E-glass are particularly useful for all types of concretes, including mortars, plasters, grouts, redi-mix, high performance, precast, shotcrete and self-consolidating concretes. The E-glass component functions as a rheology modifier in that it increases flow, controls creep, and increases workability while simultaneously controlling bleed water and shrinkage. The E-glass added in the compositions of the invention as both 4 to 325 mesh, and/or as less than 325 mesh size particles does not contribute to ASR. In the compositions of the invention, the E-glass particles in the composition of about 325 mesh or less are pozzolanic and can produce a cement which will outperform cements containing fly ash in reducing expansion due to ASR of concrete compositions produced therefrom.

Many concrete compositions contain pozzolanic substances such as fly ash, blast furnace slag, metakaolin and/or silica fume. The use of ground E-glass in compositions of the present invention allows the reduction or elimination of this expensive component of current compositions. Accordingly, in a preferred embodiment of the invention, a concrete composition is provided which contains a reduced amount of pozzolan. Most preferably, pozzolanic substances are not present, other than E-glass itself. As will be noted, however, the addition of E-glass provides for attenuation or elimination of ASR in concrete compositions useful for applications other than as pool plasters (see, e.g., concrete compositions of the present invention comprising glass aggregate).

An example of the component composition of E-glass is shown in Table 1 below.

TABLE 1

| Component | DL (%)* | Results (%) |
|---|---|---|
| Aluminum oxide | 0.738 | 13.536 |
| Boron oxide ($B_2O_3$) | 0.031 | 4.451 |
| Calcium oxide | 0.131 | 20.416 |
| Chromium oxide | 0.002 | 0.014 |
| Iron (III) oxide | 0.067 | 0.220 |
| Magnesium oxide | 0.008 | 0.353 |
| Potassium oxide | 0.020 | 0.086 |
| Silicon dioxide | 16.711 | 49.597 |
| Sodium oxide | 0.316 | 1.372 |
| Strontium oxide | 0.012 | 0.065 |
| Sulfur trioxide | 0.058 | 0.119 |
| Titanium oxide | 0.007 | 0.403 |

*DL = detection limit

In yet another aspect, the present invention relates to a concrete composition comprising a glass aggregate, cement, and E-glass particles. In a preferred embodiment, the aggregate is at least about 50% glass. More preferably, the aggregate is at least about 75% glass. More preferably, the aggregate is at least about 90% glass. Most preferably, the aggregate is about 100% glass. It will be recognized, however, that glass aggregate according to the compositions of the invention may be present as any fraction of the total aggregate component of the composition.

In another preferred embodiment, the glass aggregate is cullet or lump cullet. When combined with E-glass, there is no maximum size for glass as an aggregate.

In another preferred embodiment, the glass aggregated comprises window glass. More preferably, the glass aggregate comprises recycled glass.

In another preferred embodiment, the cement is high alkali cement.

In another preferred embodiment, the cement is low alkali cement. The amount of added E-glass may be reduced when low-alkali cement is utilized.

In another preferred embodiment, E-glass particles replace from about 10% to about 30%, by weight, of the standard amount of cement present in the composition. More preferable, the E-glass particles replace from about 15% to about 25%, by weight, of the standard amount of cement present in the composition. Most preferably, the E-glass particles replace about 20%, by weight, of the standard amount of cement present in the composition.

In another preferred embodiment, the size of the E-glass particles comprises a maximum particle size of from about 270 to about 325 mesh. Most preferably, the maximum particle size is about 325 mesh.

In another preferred embodiment, the size of the E-glass particles comprises a maximum particle size of from about 4 to about 100 mesh. More preferably, the maximum particle size is from about 80 to about 100 mesh. Most preferably, the maximum particle size is about 100 mesh.

In another preferred embodiment, a concrete compositions is provided which comprises two particle size ranges of E-glass, fine particles having a maximum size of from about 270 to about 325 mesh and larger particles up to a maximum size of about 4 to about 100 mesh. This composition can include other pozzolans such as silica fume or metakaolin. Further, these compositions can also include a lithia-containing substance such as lithium nitrate, lithium carbonate or a lithia-containing glass.

A major problem associated with the use of glass aggregates in concrete results from the alkali content of the glass. Expansion due to alkali-aggregate (silica) reaction (ASR) using glass aggregate is a well-known phenomenon. The size of the glass particles may be somewhat significant with regard to overall expansion. Using glass as aggregate, there are no limitations on the size of the glass aggregate other than use of sizes that allow for proper consolidation and workability. While smaller sizes do not appear to cause excessive expansion, sizes required for proper aggregate size distribution and/or visual effects have been shown to cause some of the most severe expansion. When used with E-glass, either alone or in combination with an added lithium-containing component such as lithia glass, glass aggregate can be used without regard to size. One hundred percent glass aggregate (fine aggregate and/or coarse aggregate) can be used without problematic expansion (see FIGS. 4–6).

Figure 4:
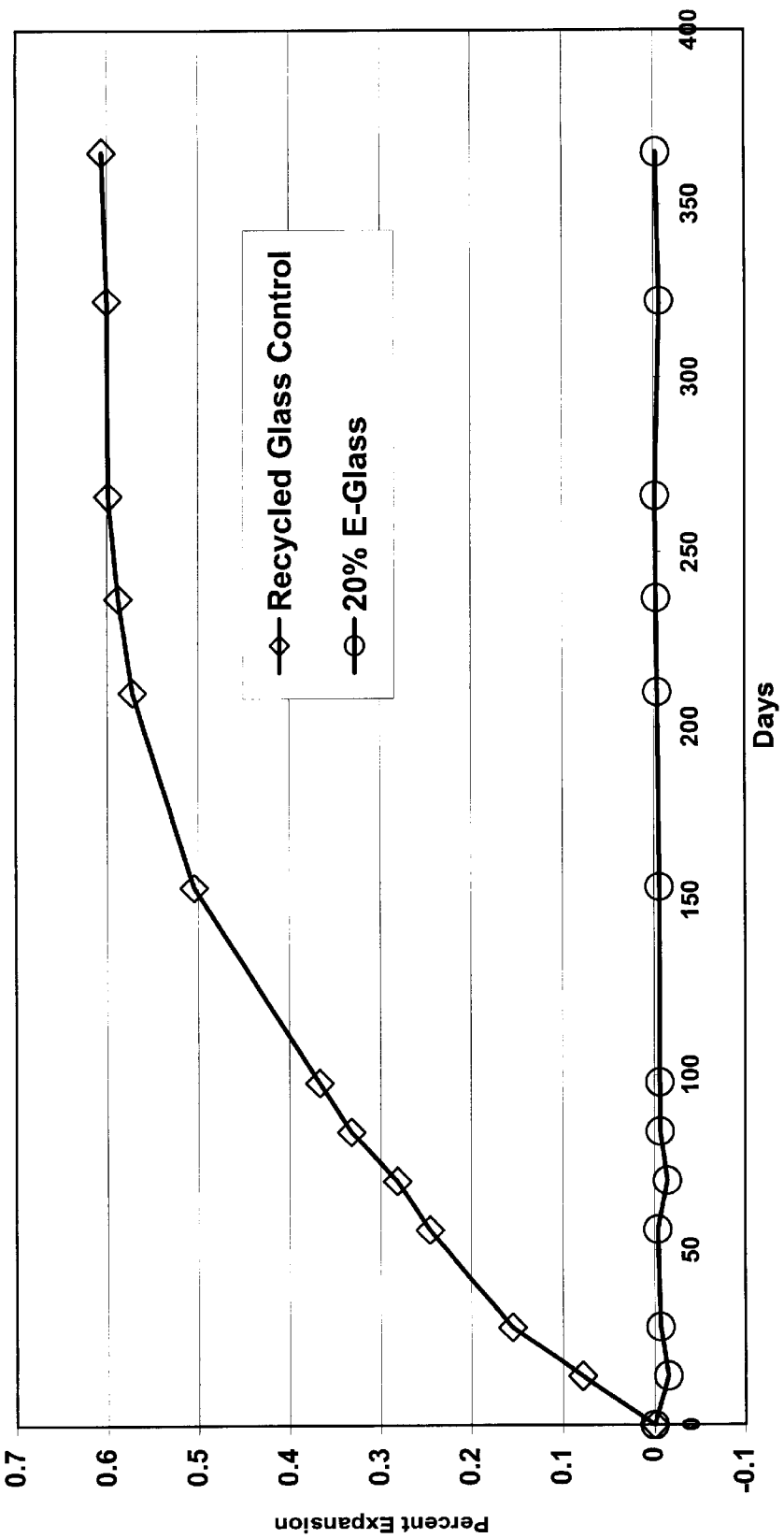
FIG. 4 is a graphic representation of the results of an ASTM C227 test showing expansion over a one year test period (shown in days on the X-axis) for a composition containing 100% recycled clear glass aggregate and 20% E-glass substituted for cement (cement alkali of 1.12% $Na_2Oe$) (open circles). A 0% E-glass composition is shown as a control (open diamonds).
Figure 5:
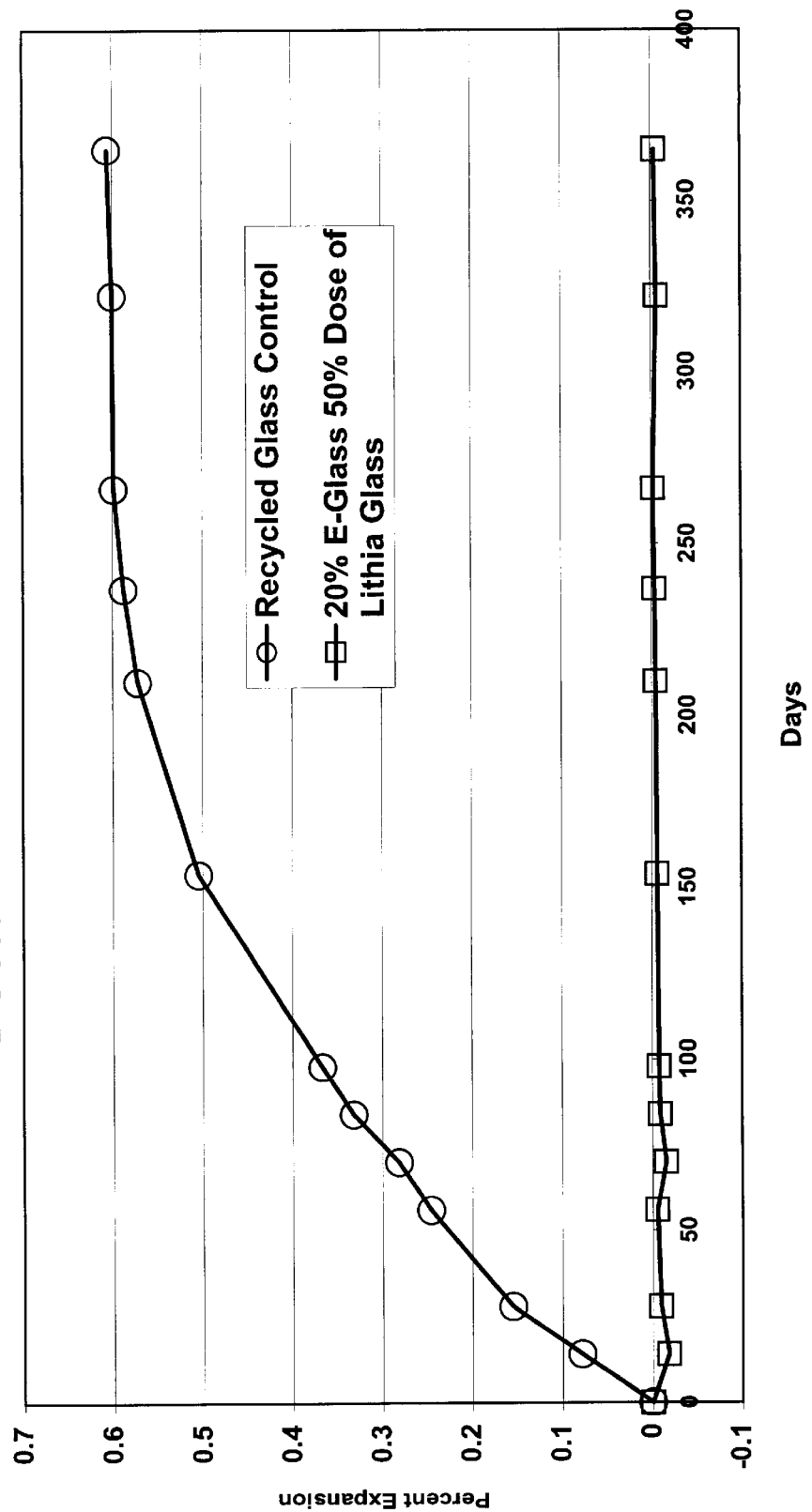
FIG. 5 is a graphic representation of the results of an ASTM C227 test as shown in FIG. 4, except the test composition (open squares) contained a 50% dose of lithia glass in addition to E-glass. A 0% E-glass, 0% dose lithia glass composition is shown as a control (open circles).
Figure 6:
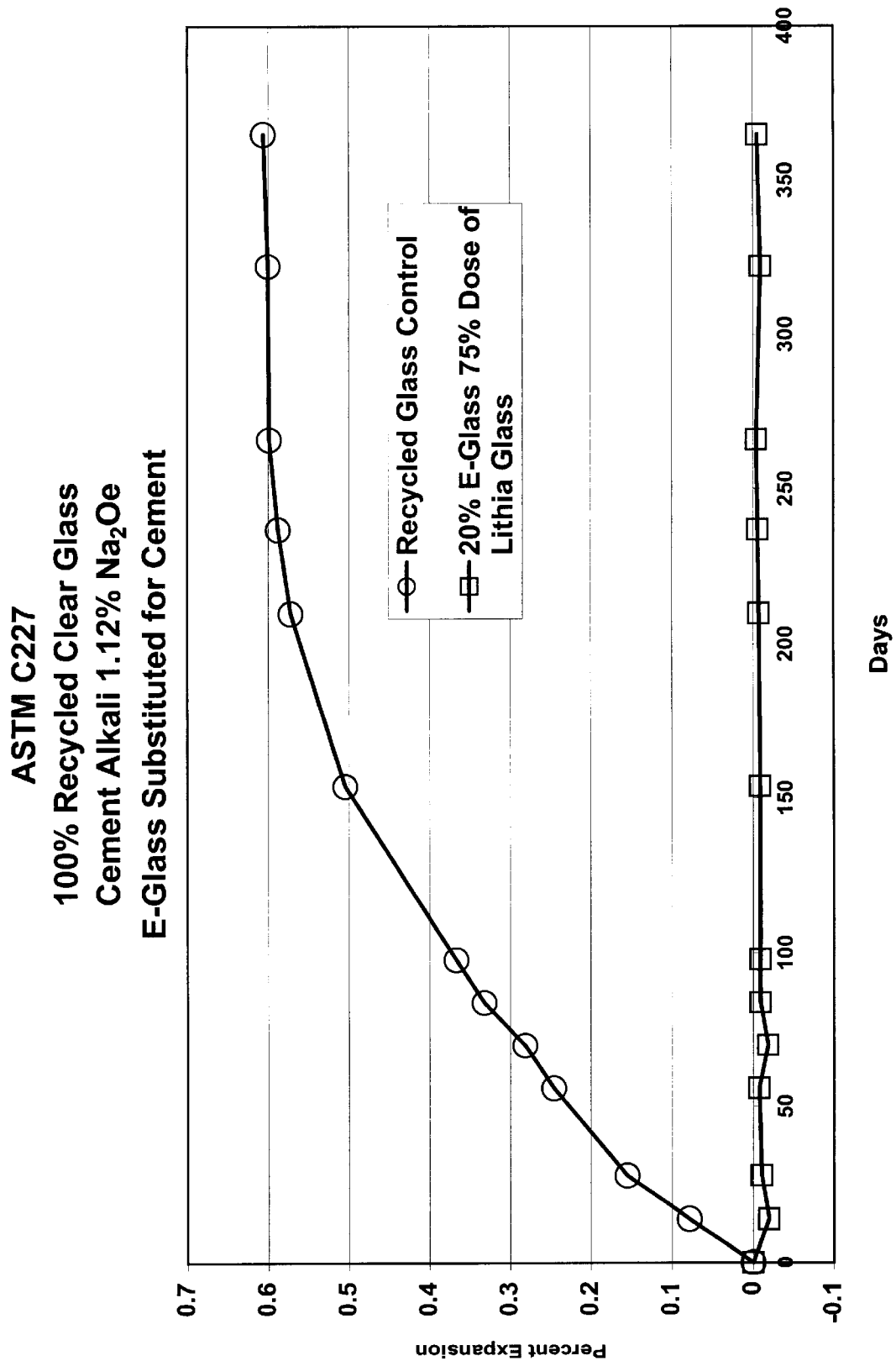
FIG. 6 is a graphic representation of the results of an ASTM C227 test as shown in FIG. 4, except the test composition (open squares) contained a 75% dose of lithia glass. A 0% E-glass, 0% dose lithia glass composition is shown as a control (open circles).
Figure 7:
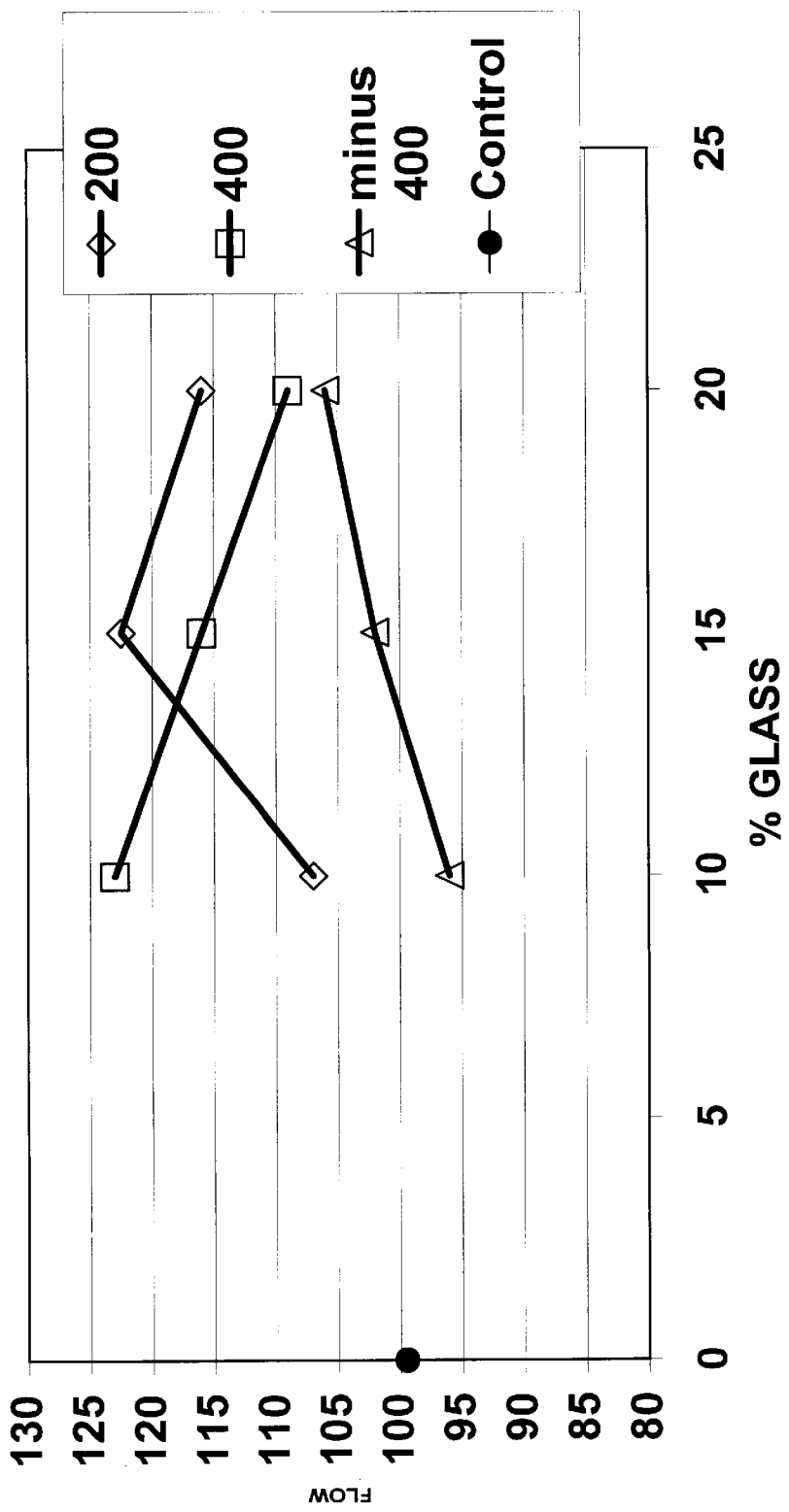
FIG. 7 is a graphic representation of the flow done during the ASTM C227 test that shows the effect of aggregate size and percent substitution on flow at a constant water/cement ratio=0.54. Details of the test procedures for flow are as indicated in ASTM C227.

E-glass, a low alkali glass, has been shown to reduce expansion in conjunction with a 100% glass aggregate and high alkali cement using the ASTM C227 test (see FIGS. 4–6 and Example 7). Alkali cements such as those utilized in the experiment of Example 7 would not typically be used under normal conditions. Because substitution of 20% of the cement with E-glass particles reduces expansion at high alkali levels, it may be assumed that compositions utilizing cements of lower alkali level will also produce advantageous results regarding expansion. In fact, use of lower alkali cement may allow reduction of the amount of added E-glass particles.

A significant advantage of the present invention is that addition of E-glass particles allows the utilization of glass aggregate. The ability to utilize glass aggregate in concrete compositions will allow a significant cost reduction for the production of concrete by providing an alternative use for recycled glass. Also, as shown herein, the compositions of the present invention provide concrete with superior characteristics.

In one aspect, the invention relates to a concrete composition comprising E-glass particles, cement, and glass aggregate.

In one preferred embodiment, the maximum size of the E-glass particles is from about 270 to about 325 mesh. In another preferred embodiment, the composition further comprises E-glass particles from about 4 to about 325 mesh.

In another preferred embodiment, E-glass particles are present in the composition in an amount ranging from about 10% to about 30% by weight of an amount of cement in a standard composition. More preferably, E-glass particles are present in the composition in an amount ranging from about 15% to about 25% by weight of the amount of cement in a standard composition. Most preferably, E-glass particles present in the composition in an amount of about 20% by weight of the amount of cement in a standard composition.

In another preferred embodiment, the aggregate comprises glass particles as coarse aggregate.

In another preferred embodiment, the aggregate comprises glass particles as fine aggregate.

In another preferred embodiment, the aggregate comprises recycled glass.

In another preferred embodiment, at least 50% of the aggregate material in the composition is glass.

In another preferred embodiment, all aggregate material in the composition is glass.

In another preferred embodiment, the composition further comprises an additional pozzolanic substance.

In another preferred embodiment, the composition further comprises a lithium-containing compound. More preferably, the lithium-containing compound is lithia glass.

In another preferred embodiment, the composition further comprises a lithium-containing compound and an additional pozzolanic material.

It should be noted that use of E-glass particles smaller than about 325 mesh is not limited to use with recycled glass but includes use with all aggregates. Further, mixtures of E-glass with metakaolin, flyash, silica fume, and other pozzolans including siliceous materials such as sludge and mine tailings, are effective in eliminating ASR in all types of concrete, not just pool plasters, and include normal concrete, mortars, plasters, grouts, redi-mix, high performance, shotcrete, and self-consolidating concretes. The benefits of using E-glass in concrete extend beyond ASR control by providing improved workability of the concrete when the E-glass particles are in the 4 to 325 mesh range, and with combinations of both ranges (E-glass particles from about 4 to about 325 mesh together with E-glass particles below about 270 to about 325 mesh) as a blended mixture with or without pozzolans and/or lithia containing substances.

In another aspect, the invention relates to a concrete composition comprising E-glass particles, cement, and reactive aggregate. Preferably, the reactive aggregate is defined as reactive according to ASTM C33, ASTM C1260, or ASTM C1293.

In a preferred embodiment, the maximum size of the E-glass particles is from about 270 to about 325 mesh.

In another preferred embodiment, the composition further comprises E-glass particles from about 4 to about 325 mesh.

In another preferred embodiment, the E-glass particles are present in the composition in an amount ranging from about 10% to about 30% by weight of an amount of cement in a standard composition. More preferably, the E-glass particles are present in the composition in an amount ranging from about 15% to about 25% by weight of said amount of cement in a standard composition. Most preferably, the E-glass particles are present in the composition in an amount of about 20% by weight of said amount of cement in a standard composition.

In a preferred embodiment, at least 50% of the aggregate material in the composition is reactive. More preferably, all aggregate material in the composition is reactive.

Mixtures of E-glass and other pozzolans may also be used to produce normal or high performance concrete that does not contain reactive aggregates (e.g., as in compositions useful as pool plasters), although reactive aggregates may be used with proper additions of E-glass alone or with other pozzolans. While E-glass of any particle size may be added to any type of concrete material to improve workability, E-glass is preferably added as material having a maximum size of about 325 mesh when used to reduce ASR.

In addition to using E-glass as a substitute for a portion of a cement component (with standard or all-glass aggregate), E-glass itself can be used as a coarse and/or fine aggregate component. In these compositions of the invention, additional E-glass may or may not be included as a partial substitute for cement. Unlike normal recycled glass, E-glass does not contribute to ASR when used as aggregate in this manner.

Accordingly, in another aspect, the invention relates to a concrete composition comprising E-glass particles as coarse aggregate, fine aggregate, or a combination of coarse and fine aggregate. More preferably, at least 25% of the aggregate material is E-glass particles.

In a preferred embodiment, the composition further comprises E-glass particles having a maximum size of from about 270 to about 325 mesh.

It will be understood that the present invention also relates to methods of producing the concrete compositions according to the foregoing description. The dry components may be premixed according to the proportions indicated for particular embodiments. For example, glass components and cement (or combinations of glass, slag, metakaolin, silica fume, fly ash, lithia glass, lithium-containing substances, or other pozzolans and cement) may be pre-mixed in dry form for later combination with aggregate and water to produce the concrete compositions of the invention. The described compositions may also be introduced into a manufacturing process in a manner well known in the concrete art, in order to produce the concrete compositions of the invention.

EXAMPLES

Example 1

Recycled Glass

In Examples 1–4 below, "glass particles" refers to particles of recycled glass which fall in a graded, average size distribution characterized as follows:

0% to 30% 100 mesh
50% to 80% 200 mesh
10% to 20% 325 mesh
0% to 20% smaller than 325 mesh A concrete composition containing recycled glass was produced by mixing the components as described in Table 2.

TABLE 2

| Component | Amount (to yield a cubic yard) | Comments |
| --- | --- | --- |
| Cement | 513 lbs (90% of stnd 570 lbs) | Ordinary Portland cement (OPC). |
| Glass Aggregate | 114 lbs To yield 1 cubic yard | 20% of stnd lbs cement by weight. Non-reactive aggregate. | stnd = standard, as in a standard amount of cement in a standard concrete composition In the composition described in Table 2, the glass component is present as 20%, by weight, of the standard amount of cement for a composition containing no added glass (defined as 570 lbs/cubic yard of concrete composition). Final yield was adjusted to 1 cubic yard by removing an appropriate volume of fine aggregate.

The above-described composition yields a product exhibiting a compression strength equal to a cement-only composition (no added glass) using the standard amount of cement. As noted in the description above, the amount of glass added may be modified to produce a final composition exhibiting various compression strengths. A composition containing 60 lbs added glass/cubic yard was observed to produce a final composition exhibiting a compression strength of 2500 psi. Further, a composition containing 90 lbs added glass/cubic yard was observed to produce a final composition exhibiting a compression strength of 3000 psi. Finally, a composition containing 110 lbs added glass/cubic yard was observed to produce a final composition exhibiting a compression strength of 4000 psi. In each composition, the final yield (cubic yard) was achieved by reducing the amount of fine aggregate added, in order to compensate for the volume of added glass particles.

The foregoing compositions provide superior workability of the concrete composition and have been observed not to contribute to ASR when non-reactive aggregate is used.

Example 2
Recycled Glass and Blast Furnace Slag

A concrete composition containing recycled glass, and blast furnace slag as an additional pozzolan, was produced by mixing the components as described in Table 3 and Table 4:

TABLE 3

| Component | Amount (to yield a cubic yard) | Comments |
| --- | --- | --- |
| Cement | 285 lbs (50% of stnd 570 lbs) | OPC |
| Blast Furnace Slag | 194 lbs | With glass, equal to 50% of stnd lbs cement by weight. |
| Glass Aggregate | 91 lbs To yield 1 cubic yard | 20% of stnd lbs cement by weight. Non-reactive aggregate. |

TABLE 4

| Component | Amount (to yield a cubic yard) | Comments |
| --- | --- | --- |
| Cement | 228 lbs (40% of stnd 570 lbs) | OPC |
| Blast Furnace Slag | 233 lbs | With glass, equal to 50% of stnd lbs cement by weight. |
| Glass Aggregate | 109 lbs To yield 1 cubic yard | 20% of stnd lbs cement by weight. Non-reactive aggregate. |

In the compositions described in Tables 3 and 4, the slag and glass components are present relative to each other as 32% glass and 68% slag. This ratio is constant whether a mix is produced with a 50% (Table 3) or a 60% (Table 4) reduction in the standard amount of cement (defined as 570 lbs cement/cubic yard of concrete composition). In each case, the above-described compositions yield a product exhibiting a compression strength equal to the cement-only composition (no added slag, no added glass) using the standard amount of cement.

Example 3
Recycled Glass, Blast Furnace Slag, and Fly Ash

A concrete composition containing recycled glass, and blast furnace slag and fly ash as additional pozzolans, was produced by mixing the components as described in Table 5:

TABLE 5

| Component | Amount (to yield a cubic yard) | Comments |
| --- | --- | --- |
| Cement | 399 lbs (70% of stnd 570 lbs) | OPC |
| Fly Ash | 114 lbs | 20% of 570 lbs cement by weight. |
| Glass | 114 lbs | 20% of 570 lbs cement by weight. |
| Aggregate | To yield 1 cubic yard | Non-reactive aggregate. |

As shown in Table 5, the total amount of cement, fly ash, and glass in the composition of Example 3 equals 110% by weight of the standard 570 lbs cement/cubic yard of the concrete composition (627 lbs/cubic yard). As in Examples 1 and 2, the composition described in Table 5 yields a product exhibiting a compression strength equal to the cement-only composition (no fly ash, no glass) using the standard amount of cement.

Example 4
Recycled Glass and Lithium-Containing Glass

A cement composition containing recycled glass was produced by mixing the components as described in Table 6.

TABLE 6

| Component | Amount | Comments |
| --- | --- | --- |
| Cement | 1600 lbs | 80% of 2000 lbs cement/glass mix |
| Glass particles | 320 lbs | 16% of 2000 lbs cement/glass mix |
| Lithium-containing glass | 80 lbs | 4% of 2000 lbs cement/glass mix. |
| Aggregate | To yield 4000 lbs | |

The inventors have shown that the composition described in Table 6 provides a mix which is especially suitable for pouring surfaces for outdoor recreational areas such as those adjacent to swimming pools. The addition of the glass particles provides the superior workability qualities as described above. The potential problem of ASR is suppressed or avoided by the inclusion of the lithium-containing glass component or other lithia containing substances such as lithium nitrate (the potential problem of ASR is avoided if the glass used is E-glass, with or without lithia compounds). The cement, glass particles, lithium-containing glass, and aggregate, or a sub-combination thereof, may be packaged as a dry mix to be combined with appropriate amounts of water to form the desired concrete composition.

Example 5

E-glass

E-glass particles are produced by grinding E-glass to a size of 325 mesh or smaller. These E-glass particles replace 20% of the cementitious component of a typical pool plaster composition containing the following proportional components:

50% stone, as small pebbles or ground marble aggregate; and

50% cementitious material*

*Typically 15% of the cementitious component would be metakaolin and/or silica fume as pozzolanic additives.

Although, E-glass-containing pool plaster compositions may also contain additional pozzolans such as metakaolin or silica fume, one feature of the present invention is that the requirement for such additives is obviated by the addition of E-glass particles. However, some further advantages may be obtained by including such pozzolans along with the E-glass.

Any or all of the dry components may be packaged as a dry mix to be combined with appropriate amounts of water to form the desired concrete composition.

Example 6

Production of E-glass-containing Cement Compositions

E-glass cullet, e.g. as a by-product produced during fiber glass manufacturing, is substituted for cement clinker in an amount of 10% to 15% by weight of the cement clinker prior to a final ball-mill grinding process. The components are then ground together to produce a final mixture having a particle size below 325 mesh. The E-glass cullet acts as a grinding aid and increases the through-put of the grinding process. The process also increases the efficiency of producing the E-glass-containing compositions of the invention by obviating the need for a separate processing step to produce E-glass particles of the desired size from unprocessed E-glass cullet, prior to addition to other cementitious components.

Example 7

Controlling Expansion of Glass Aggregate Concrete Compositions

Figure 2:
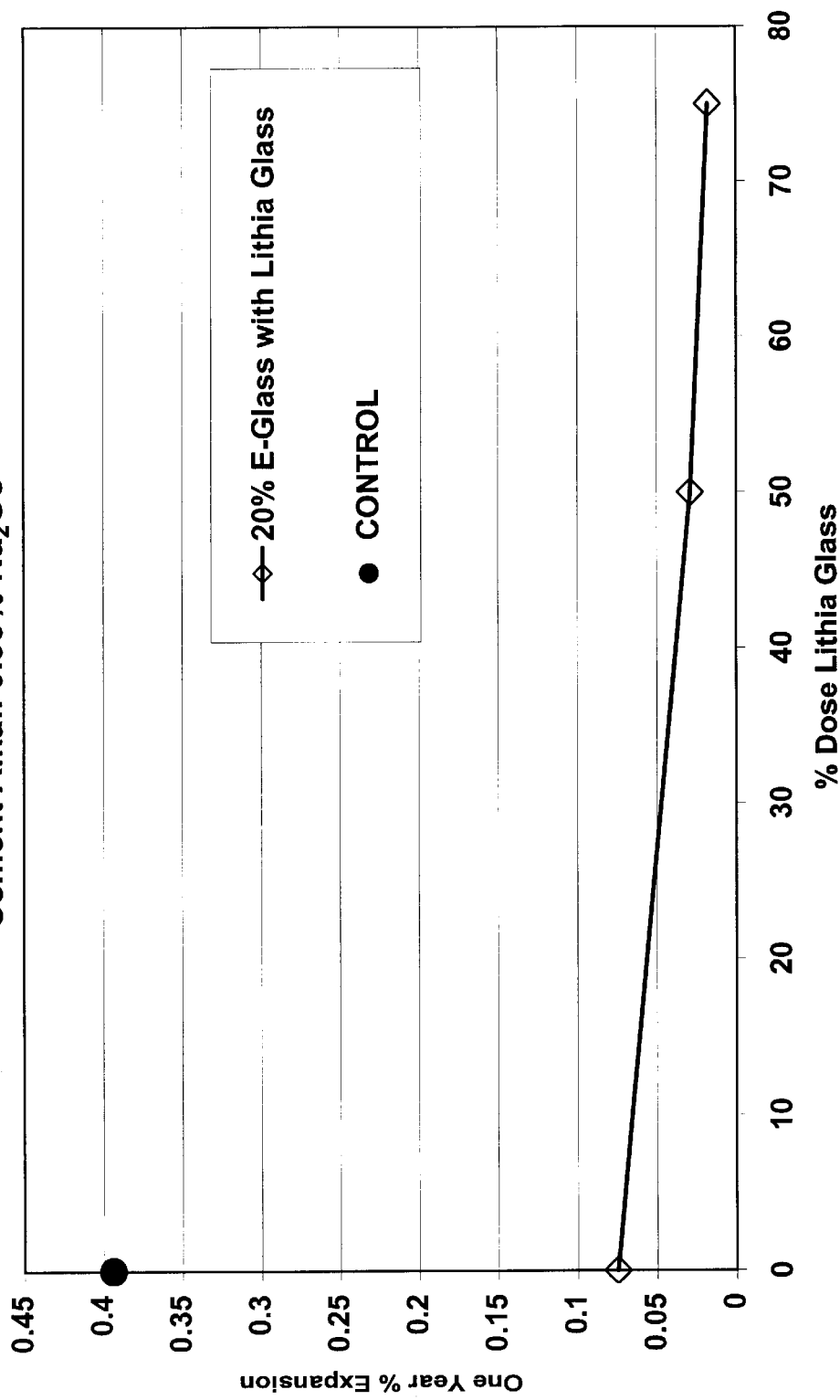
FIG. 2 is a graphic representation of the results of an ASTM C227 test similar to that illustrated in FIG. 1, except that test compositions (other than 0% E-glass, 0% Dose Lithia glass-closed circle "Control") show increasing % dose of lithia glass (open diamonds). 100% dose of lithia glass is defined as in Example 7. Cement alkali was 0.99% $Na_2Oe$.
Figure 3:
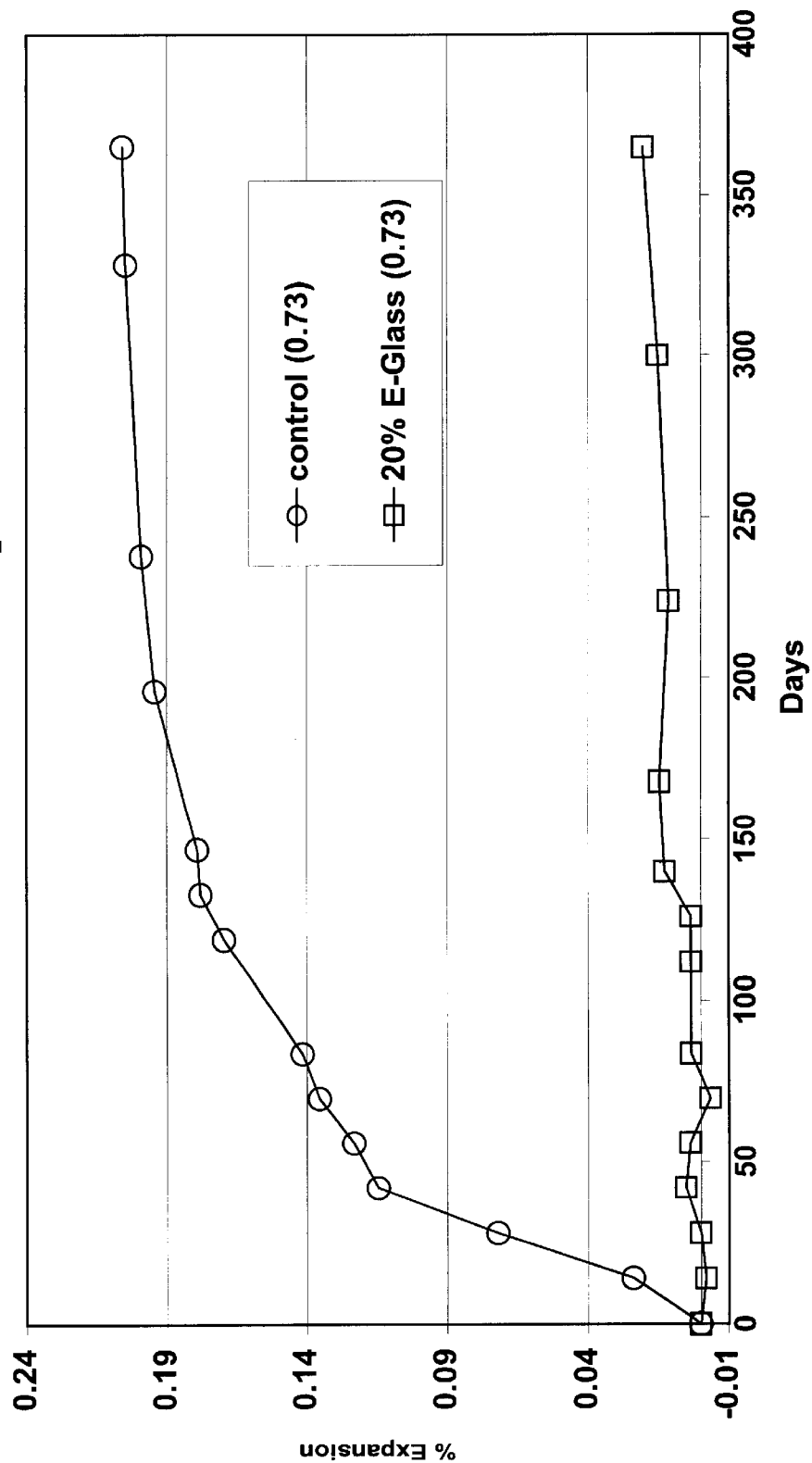
FIG. 3 is a graphic representation of the results of an ASTM C227 test showing expansion over a one year test period (shown in days on the X-axis) for a composition containing 20% E-glass substituted for cement. A 0% E-glass composition is shown as a control. Cement alkali was 0.73% $Na_2Oe$.

FIGS. 1 and 3 show how E-glass substituted for cement can control expansion in concrete compositions using New Mexico aggregate. New Mexico aggregate is a highly reactive rhyollitic aggregate (aggregate referred to as "AL" in Stark, 1993, SHRP C343 report, Strategic Highway Research Program, Federal Highway Administration (FHWA)). FIG. 2 shows the control of expansion with increasing amount of lithia glass, in addition to 20% cement substitution with E-glass.

Alkali in cement is expressed as the sum of the sodium and potassium with a weight factor (0.658 $K_2O+Na_2O$)that equals the $Na_2Oe$ or the sodium equivalent. Lithium dosage is based upon the total alkali in the cement. The lithia is dosed at 100 percent when the there are 0.74 moles of lithia (Li) for each mole of Na in the $Na_2Oe$. When E-glass is included, it replaces a certain amount of cement. Because the dosage is calculated for the cement, the dosage is based on the remaining cement, e.g., for 10% E-glass substitution of cement, the $Na_2Oe$ is based on the 90% cement remaining. Cements have a range of from about 0.2% to about 1.5% $Na_2Oe$. A low alkali cement is below about 0.5% $Na_2Oe$. Average cements have $Na_2Oe$'s of about 0.8%.

Laboratory testing was performed according to ASTM C227 utilizing a glass aggregate (recycled glass aggregate), in combination with a cement, 20% of which was replaced by E-glass particles according to the present invention. The test composition is shown in Table 7:

TABLE 7

ASTM C227 Testing

| Control | Test (20% E-glass substitution of cement) |
| --- | --- |
| 440 g cement ($Na_2Oe$ = 1.12%) | 352 g cement ($Na_2Oe$ = 1.12%) + 88 g E-glass particles |
| 990 g | 990 g 100% glass aggregate |
| 237.6 | 237.6 Water |

FIG. 4 shows that the control composition (no E-glass, 100% glass aggregate) exhibited expansion characteristic of attempts to utilize glass aggregate in concrete compositions (1 year time course of the ASTM C227 test-expansion limit of 0.1% at one year). However, substitution of 20% of the standard test amount of cement (88 g E-glass particles) resulted in no detectable expansion due to alkali-silica (aggregate) reaction (ASR).

FIGS. 5 and 6 show the control of expansion as assessed using the ASTM C227 protocol, where the test compositions included a 50% and 75% dose of lithia glass, respectively, in addition to 20% cement substitution with E-glass.

With respect to the descriptions set forth above, optimum aspects and features of the invention are deemed readily apparent and obvious to those skilled in the art, and all equivalent relationships to those illustrated in the drawings and described in the specification are intended to be encompassed herein. The foregoing is considered as illustrative only of the principal of the invention. Because numerous modifications and changes will readily occur to those skilled in the art, it is not intended to limit the invention to the exact compositions and methods as shown and described, and all suitable modifications and equivalents falling within the scope of the appended claims are deemed within the present inventive concept.

What is claimed is:

1. A concrete composition comprising E-glass particles, cement, and glass aggregate.

2. The concrete composition of claim 1, wherein the maximum size of the E-glass particles is from about 270 to about 325 mesh.

3. The concrete composition of claim 2, further comprising E-glass particles from about 4 to about 325 mesh.

4. The concrete composition of claim 1, wherein said E-glass particles are present in the composition in an amount ranging from about 10% to about 30% by weight of a total cementitious component of the composition.

5. The concrete composition of claim 1, wherein said E-glass particles are present in the composition in an amount ranging from about 15% to about 25% by weight of a total cementitious component of the composition.

6. The concrete composition of claim 1, said E-glass particles present in the composition in an amount of about 20% by weight of a total cementitious component of the composition.

7. The concrete composition of claim 1, wherein said aggregate comprises glass particles as coarse aggregate.

8. The concrete composition of claim 1, wherein said aggregate comprises glass particles as fine aggregate.

9. The concrete composition of claim 1, wherein said aggregate comprises recycled glass.

10. The concrete composition of claim 1, wherein at least 50% of the aggregate material in the composition is glass.

11. The concrete composition of claim 1, wherein all aggregate material in the composition is glass.

12. The concrete composition of claim 1, wherein said composition further comprises an additional pozzolanic substance.

13. The concrete composition of claim 1, further comprising a lithium-containing compound.

14. The concrete composition of claim 13, wherein the lithium-containing compound is lithia glass.

15. The concrete composition of claim 1, further comprising a lithium-containing compound and an additional pozzolanic material.

16. A concrete composition comprising E-glass particles, cement, and reactive aggregate.

17. The concrete composition of claim 16, wherein the maximum size of the E-glass particles is from about 270 to about 325 mesh.

18. The concrete composition of claim 17, further comprising E-glass particles from about 4 to about 325 mesh.

19. The concrete composition of claim 16, wherein said E-glass particles are present in the composition in an amount ranging from about 10% to about 30% by weight of a total cementitious component of the composition.

20. The concrete composition of claim 16, wherein said E-glass particles are present in the composition in an amount ranging from about 15% to about 25% by weight of a total cementitious component of the composition.

21. The concrete composition of claim 16, said E-glass particles are present in the composition in an amount of about 20% by weight of a total cementitious component of the composition.

22. The concrete composition of claim 16, wherein the reactive aggregate is defined as reactive according to ASTM C33, ASTM C1260, or ASTM C1293.

23. The composition of claim 16, wherein at least 50% of the aggregate material in the composition is reactive.

24. The concrete composition of claim 16, wherein all aggregate material in the composition is reactive.

25. A concrete composition comprising E-glass particles as coarse aggregate, fine aggregate, or a combination of coarse and fine aggregate.

26. The composition of claim 25, further comprising E-glass particles having a maximum size of from about 270 to about 325 mesh.

27. The composition of claim 25, wherein at least 25% of the aggregate material is E-glass particles.

28. A concrete composition comprising glass particles, cement, aggregate, and E-glass particles having a maximum size of from about 270 mesh to about 325 mesh, wherein about 0% to about 30% of the glass particles is about 100 mesh, about 50% to about 80% of the glass particles is about 200 mesh, about 10% to about 20% of the glass particles is about 325 mesh, and about 0% to about 20% of the glass particles is below about 325 mesh.

29. A process for preparing a cementitious component for use in concrete compositions comprising E-glass particles, cement, and aggregate selected from the group consisting of glass aggregate and reactive non-glass aggregate, wherein an E-glass component is added during a general processing operation in an unprocessed form along with at least one additional unprocessed cementitious components, wherein the general processing operation precedes or is concurrent with at least one processing step that includes at least some grinding.

30. The process of claim 29, wherein said E-glass component is added to said at least one additional unprocessed cementitious component prior to the general processing operation.

31. The process of claim 30, wherein said general processing operation comprises a final grinding process.

32. The process of claim 29, wherein said E-glass component comprises E-glass cullet.

33. The process of claim 29, wherein said E-glass cullet comprises a by product of a process for producing fiberglass.

34. The process of claim 29, wherein said at least one additional unprocessed cementitious component is cement clinker.

* * * * *

UNITED STATES PATENT AND TRADEMARK OFFICE
CERTIFICATE OF CORRECTION

PATENT NO. : 6,699,321 B2  
APPLICATION NO. : 09/999659  
DATED : March 2, 2004  
INVENTOR(S) : James E. Pelot and Stephen Z. Baxter Page 1 of 1

It is certified that error appears in the above-identified patent and that said Letters Patent is hereby corrected as shown below:

Title Page item 22

Filing Date: should be October 31, 2001

Signed and Sealed this

Twenty-ninth Day of January, 2008

JON W. DUDAS  
*Director of the United States Patent and Trademark Office*